(12) United States Patent
Sutton et al.

(10) Patent No.: US 10,362,039 B2
(45) Date of Patent: Jul. 23, 2019

(54) PERMISSIONS FOR HYBRID DISTRIBUTED NETWORK RESOURCES

(71) Applicant: Amazon Technologies, Inc., Seattle, WA (US)

(72) Inventors: Wesley Marlin Sutton, San Francisco, CA (US); Apolak Borthakur, Palo Alto, CA (US); Derek Avery Lyon, San Francisco, CA (US); Raviprasad Venkatesha Murthy Mummidi, Mountain View, CA (US); Karthikeyan Natarajan, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 15/384,182

(22) Filed: Dec. 19, 2016

(65) Prior Publication Data
US 2017/0099299 A1    Apr. 6, 2017

Related U.S. Application Data

(62) Division of application No. 14/265,158, filed on Apr. 29, 2014, now Pat. No. 9,531,719.

(51) Int. Cl.
*H04L 29/06*    (2006.01)

(52) U.S. Cl.
CPC .......... *H04L 63/105* (2013.01); *H04L 63/083* (2013.01); *H04L 63/10* (2013.01); *H04L 63/0815* (2013.01)

(58) Field of Classification Search
CPC ..... H04L 63/105; H04L 63/083; H04L 63/10; H04L 63/0815
See application file for complete search history.

(56) References Cited

U.S. PATENT DOCUMENTS

| 6,279,111 | B1 * | 8/2001 | Jensenworth ......... G06F 21/335 |
| | | | 713/159 |
| 8,474,027 | B2 | 6/2013 | Meijer et al. |
| 9,300,639 | B1 * | 3/2016 | Roth ................... H04L 63/0428 |
| 2002/0116396 | A1 | 8/2002 | Somers et al. |
| 2008/0244721 | A1 | 10/2008 | Barrus et al. |
| 2011/0125894 | A1 | 5/2011 | Anderson et al. |
| 2012/0089682 | A1 * | 4/2012 | Wu ....................... H04W 28/24 |
| | | | 709/206 |

(Continued)

*Primary Examiner* — Sarah Su
(74) *Attorney, Agent, or Firm* — Davis Wright Tremaine LLP

(57) ABSTRACT

A computing resource service provider may receive, from a user client connected to an on-premises network, a security document specifying one or more user roles defining a level of access to customer resources within the on-premises network. In response, the service provider may generate and provide the user client with a cookie specifying the user roles and including an address for an interface within the service provider network. The service provider may receive a request from the user client to access one or more customer resources hosted by the service provider. The request may include the cookie previously provided to the user client. Accordingly, the service provider may extract the user roles from the cookie and determine, based at least in part on these user roles, whether to fulfill the user client request.

20 Claims, 11 Drawing Sheets

(56) References Cited

U.S. PATENT DOCUMENTS

| | | |
|---|---|---|
| 2012/0159601 A1 | 6/2012 | Dalzell et al. |
| 2013/0036455 A1* | 2/2013 | Bodi .................. H04L 63/0807 726/4 |
| 2014/0026194 A1 | 1/2014 | Smith |
| 2014/0068700 A1* | 3/2014 | Reilly .................... H04L 63/20 726/1 |
| 2014/0173693 A1 | 6/2014 | Bikkula et al. |
| 2015/0058950 A1* | 2/2015 | Miu ..................... H04L 63/105 726/7 |
| 2015/0059003 A1* | 2/2015 | Bouse .................... G06F 21/31 726/28 |
| 2015/0163061 A1 | 6/2015 | Gupta |
| 2015/0278500 A1 | 10/2015 | Burch et al. |
| 2016/0134488 A1 | 5/2016 | Straub et al. |
| 2018/0020005 A1* | 1/2018 | Beiter .................... H04L 63/10 |

* cited by examiner

PERMISSIONS FOR HYBRID DISTRIBUTED NETWORK RESOURCES

CROSS REFERENCE TO RELATED APPLICATIONS

This application is a divisional of U.S. patent application Ser. No. 14/265,158, filed Apr. 29, 2014, entitled "PERMISSIONS FOR HYBRID DISTRIBUTED NETWORK RESOURCES" which is incorporated by reference for all purposes.

BACKGROUND

Customers utilize one or more applications provided by a computing resource service provider or other service provider to manage resources in a data center operated by the customers (e.g., on-premises) or in a remote network (e.g., off-premises), dependent on the customers' business needs. The one or more applications may be configured to enable a customer to migrate resources between their on-premises network environment and off-premises network environments, such as a computing resource service provider network environment. However, a customer desiring to maintain a variety of resources on-premises and off-premises may encounter numerous difficulties. For instance, a customer desiring to enable other users to access one or more resources located in an off-premises network environment may need to instruct these users to each create an individual account within the off-premises network environment. Further, the customer may need to access the off-premises network environment to define a level of access for each of these user accounts, which may increase the administrative burden of the customer in managing his or her resources on-premises and off-premises.

BRIEF DESCRIPTION OF THE DRAWINGS

Various embodiments in accordance with the present disclosure will be described with reference to the drawings, in which.

DETAILED DESCRIPTION

Figure 1:
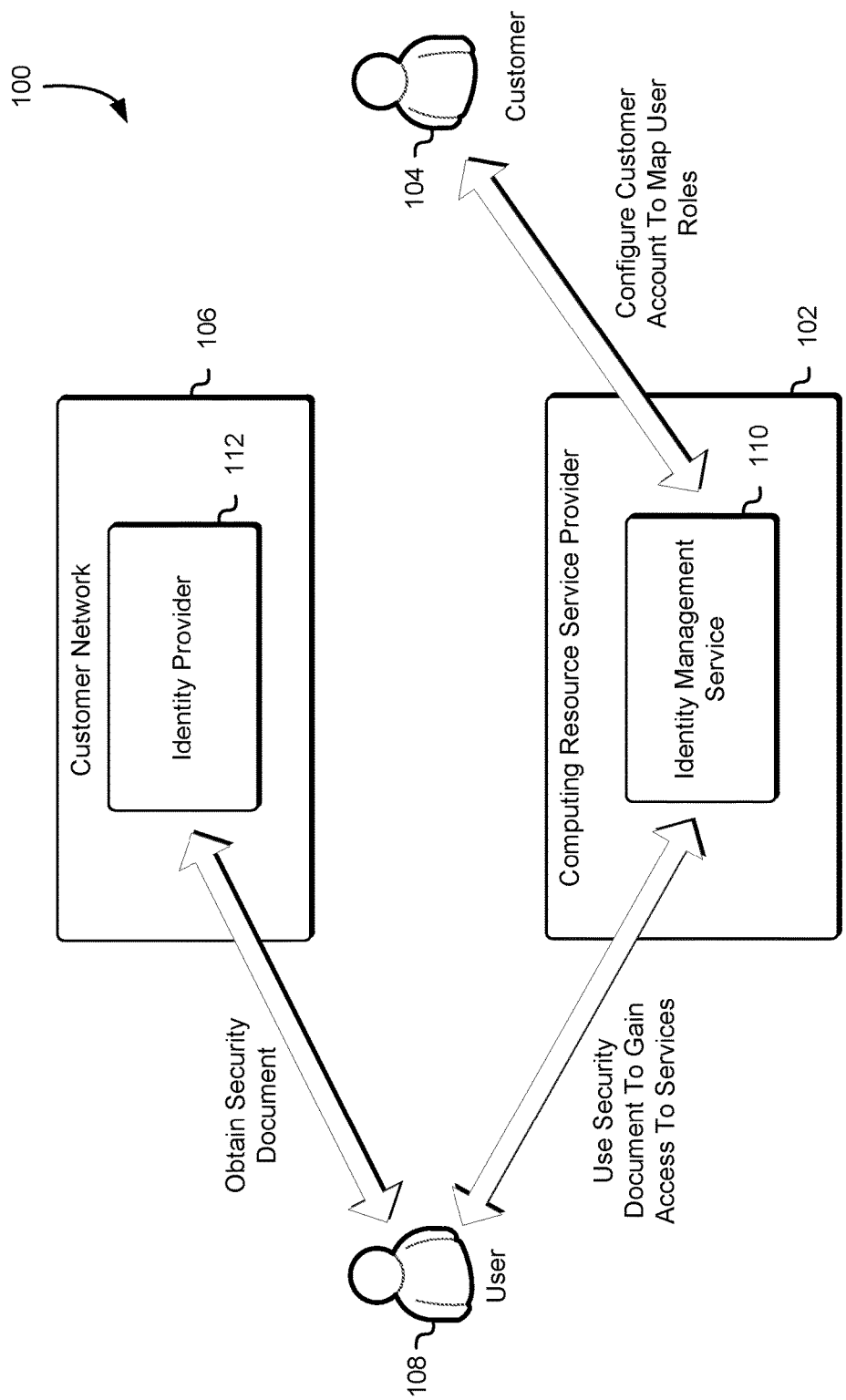
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to defining permissions for establishing a level of user access to resources on-premises and off-premises. In an embodiment, an entity (e.g., an organization) communicates, through associated computing devices, with an identity management service provided by a computing resource service provider. The communications may be made using application programming interface (API) calls to the identity management service. In some examples, a communication to the identity management service is to configure the entity's account to enable use of security documents and other types of tokens specifying an assertion of an on-premises network identity and allowable user roles (e.g., level of access to resource(s)) within an off-premises network. Additionally, the entity may store, in the entity's account, a mapping of user identities within the on-premises network and corresponding off-premises roles (e.g., sets of permissions) to resource(s) within the off-premises (e.g., computing resource service provider) network. The entity may be a customer of a computing resource service provider that operates various services such as a virtual computer system service, object-based data storage services, database services, the aforementioned identity management service and a plurality of other services.

In various embodiments, the entity manages and configures an identity provider within the on-premises network to provide a security document to users of the on-premises network that want to access a resource(s) or service(s) provided by the computing resource service provider. While security documents, such as Security Assertion Markup Language (SAML) documents are used throughout the present disclosure for the purpose of illustration, the techniques described herein are adaptable for other types of tokens. In an embodiment, when a user provides his/her user credentials, through an on-premises client, to request access to the computing resource service provider network, the on-premises client may send this request to an identity provider, which may verify the user's credentials. Based on this verification, the identity provider may generate a security document, which may specify the user's identity within the on-premises network. This security document is then provided to the user for use in accessing the computing resource service provider network.

In an embodiment, when the user uses the security document to access the computing resource service provider network, the computing resource service provider will verify that the security document is valid and use the assertion of the user's identity within the security document to create a cookie. For instance, the computing resource service provider may use the mapping of the user identities within the on-premises network to off-premises permissions to determine a policy for the user. The cookie may specify this policy defining permissions for the user within the off-premises network, as well as other information that may be used by the computing resource service provider to verify the authentication of the user (e.g., secret signing key). The cookie may be encrypted by the computing resource service provider. Once the cookie has been created, the computing resource service provider may transmit the cookie to the on-premises client where it may be stored for later use, such as when a user attempts to access the computing resource service provider network.

In an embodiment, when the user, through the on-premises client, uses the cookie to access a resource(s) or service(s) provided by the computing resource service provider, the computing resource service provider obtains the cookie and decrypts the cookie to obtain the policy specified therein. The computing resource service provider may evaluate the policy to determine whether the policy is still valid. If the policy is still valid, the computing resource service provider may enable the user to access the resource(s) or service(s) in accordance with the policy specified in the cookie. However, if the policy is not valid, the computing resource service provider may determine whether there is a current policy stored therein and utilize this current policy to generate a new cookie for the user. In some embodiments, the computing resource service provider may, alternatively, deny the user's request to access these resource(s) or service(s).

In an embodiment, the computing resource service provider, based at least in part on the policy specified in the cookie, creates and uses a temporary token to enable the user to access the entity's resource(s) and perform actions in accordance with the delegated access granted by the identity management service on behalf of the entity. For instance, when a user attempts to perform an action on a particular resource, the corresponding service where the resource may be maintained may use the temporary token to determine whether the user is authorized to perform the requested action. Based on the temporary token, the service may allow or deny the user to perform the requested action.

In this manner, an entity may be able to allow users of the on-premises network to utilize a single set of credentials to access both the on-premises network and the off-premises network to interact with the entity's resources. In addition, the techniques described and suggested herein facilitate additional technical advantages. For example, because the delegated access to the entity's resource(s) within the off-premises network is based on the mapping of user roles provided by the entity to the identity management service, the entity may no longer be required to create a user account within the off-premises network for each user that the entity wants to have access to his/her resources. Additionally, the entity may no longer be required to generate a policy for each of the users, as the user roles, which may be common for a plurality of users, may be used to define the level of access to the entity's resource(s) within the off-premises network.

FIG. 1 shows an illustrative example of an environment 100 in which various embodiments may be practiced. In the environment 100, a computing resource service provider 102 provides various computing resource services to customers of the computing resource service provider. The computing resource service provider 102 may be an organization that hosts various computing resources on behalf of one or more customers. For example, a computing resource service provider 102 may operate one or more facilities that are used to host various computing hardware resources, such as hardware servers, data storage devices, network devices and other equipment, such as server racks, networking cables and the like. The computing resource service provider 102 may utilize its computing hardware resources to operate one or more services. Such services may include services that enable customers of the computing resource service provider 102 to remotely manage computing resources to support the customers' operations while reducing the needs of the customers to invest in physical equipment. Example services include, but are not limited to, various data storage services (object-based data storage services, archival data storage services, database services and the like), identity management services, program execution services and other services. The services may be used by customers to support a wide variety of activities, such as operating a website, operating enterprise systems supporting an organization, distributed computation and/or other activities.

Accordingly, as illustrated in FIG. 1, the environment 100 includes a customer 104. The customer 104 may be an individual, organization or automated process that could utilize one or more services provided by the computing resource service provider 102 to provision and manage one or more resources to support his or her operations. The customer 104 may further be an administrator of a customer network 106, which may include a plurality of computing hardware resources which may be located at least in part on the customer premises. In some embodiments, the computing hardware resources that may be included within the customer network 108 include hardware servers, data storage devices, network devices and other equipment, such as server racks, networking cables and the like. The customer 104 may utilize these computing hardware resources to operate one or more services, which may be utilized by a user 112 to access computer system resources within the customer network 106. Accessing computer system resources may include creating resources, updating resources, deleting resources, obtaining information about the resources and the like.

Accordingly, as illustrated in FIG. 1, the environment 100 includes a user 108. The user 108 may be an individual, organization or automated process that may grant access to one or more computer system resources within the customer network 106 to support the customer's 104 business needs. For instance, the user 108 may be an employee of the customer 104 who may be required to manage one or more databases within the customer network 106. Further, this user 108 may be required to access the computing resource service provider 102 to perform one or more actions on customer 104 resources provisioned and maintained by one or more services provided by the computing resource service provider 102.

In order to enable a user 108 to access the computing resource service provider 102 and perform one or more actions using the customer's 104 resources, the customer 104 may be required to customize his/her account within the computing resource service provider 102 network to define a level of access for the user 108. In an embodiment, rather than creating a distinct user account, the customer 104 can access an identity management service 110, provided by the computing resource service provider 102, to configure his own account to enable the use of security documents to ensure that the user 108 has been properly authenticated through the customer network 106. Additionally, the customer 104 may provide the identity management service 110 with a mapping of user identities within the customer network 106 and corresponding delegated access permissions for customer resources within the computing resource service provider 102 network. Delegated access permissions may include read-only access to certain computing resources, write-access to certain computing resources and the like. This may enable the identity management service 110 to utilize the mapping and the specified user identity to define one or more delegated access permissions for a user 108 attempting to access one or more customer resources maintained by the computing resource service provider 102.

When a user 108 utilizes a customer network 106 client to request, through a user computing device, access to the computing resource service provider 102 in order to interact with one or more customer 104 resources, the request may be sent, by the customer network 106 client, to an identity provider 112 within the customer network 106. The identity provider 112 may be a collection of computing resources that may collectively be configured to provide identification and authentication information for a computing resource domain, such as the customer network 106, and, as a result, is operable to provide identification information and authentication information of a user 108 to the user 108 to enable the user 108 to access other networks. For example, the identity provider 112 may be a computing device, computing system process, program, application, service, module or a combination of these and/or other such computing system entities. For instance, when the user 108 submits a request to access the computing resource service provider 102 from within the customer network 106, the identity provider 112 may generate a security document specifying the user's 108 identity within the customer network 106, as well as recipient information (e.g., a Uniform Resource Locator (URL) directed to a particular resource, such as an interface provided by the computing resource service provider 102, etc.) and a digital signature, which may be used by the computing resource service provider 102 to validate the security document. The security document may be a cryptographically verifiable (e.g., through digital signature verification and/or decryption) collection of information and/or may be created using one or more data formats, such as the Security Assertion Markup Language (SAML) format, OpenID and the like. It should be noted that the security document may specify additional and/or alternative information usable to authenticate a user 108. Once the identity provider 112 has generated the security document, the identity provider 112 may provide the user 108 with the security document, which the user 108 may use to gain access to one or more services provided by the computing resource service provider 102 to access one or more customer 104 resources. The security document, in some examples, may also be used by the user 108 for access to access on-premises computing resources that are hosted outside of the control of the computing resource service provider.

In an embodiment, the identity provider 112 is operated through a separate computing resource domain and, thus, may not be part of the customer network 106. Accordingly, the identity provider 112 may be connected to the customer network 106 through one or more communications networks, such as the Internet. The identity provider 112 may still generate a security document specifying the one or more user roles within the customer network 106, as well as recipient information and a digital signature.

When the computing resource service provider 102 receives a security document from the user 108, the computing resource service provider 102 may utilize the security document to use an assertion of an identity for the user 108 within the customer network 106, utilize the mapping of user identities within the on-premises customer network 106 to policies to identify a policy for the user 108 and generate a cookie, which may be used to provide information to an interface, provided by the computing resource service provider 102, to access one or more services and/or the customer's 104 one or more resources. The cookie may, for instance, be a cryptographically verifiable collection of information that a client (e.g., browser application) of the user 108 transmits with requests made to a console application (e.g., provided in the form of a website) provided by the computing resource service provider to manage computing resources hosted by the computing resource service provider for the customer associated with the user 108. Accordingly, the computing resource service provider 102 may provide the cookie to the user 108 through the user's 108 local (relative to the customer network 106) client. This may enable the user 108 to utilize the local client to access the interface and submit a request, through the interface, to access the customer's 104 one or more resources. While a cookie (a specific example of a token) is used extensively throughout the present disclosure for the purpose of illustration, other tokens and data files may be used to enable a user 108 to access the interface provided by the computing resource service provider 102.

Once the computing resource service provider 102 receives, through the interface, a cookie from the user 108, the computing resource service provider 102 may utilize the policy from the cookie and transmit a request to the identity management service 110 to obtain one or more delegated access permissions for the user 108, which may be used to define a level of access to the customer's 104 one or more resources maintained by the computing resource service provider 102. Accordingly, the identity management service 110 may determine whether the policy obtained from the cookie is still valid. For instance, the identity management service 110 may utilize the policy from the cookie and compare this policy to an existing policy maintained within the identity management service 110 to determine whether any discrepancies exist. For example, if the customer 104 has updated the policy within the identity management service 110 after creation of the cookie but before receipt of the user's 108 request to access one or more customer 104 resources within the computing resource service provider 102 network, the policy encoded within the cookie will no longer be up to date. Accordingly, the identity management service 110 may generate a new cookie that specifies this updated policy and provide this cookie to the user 108. Alternatively, if no discrepancies exist, the identity management service 110 may utilize the policy to define one or more delegated access permissions for the user 108.

Based at least in part on the newly defined delegated access permissions for the user 108, the identity management service 110 may generate a temporary token specifying these delegated access permissions for the user 108 and provide this temporary token to the computing resource service provider 102. The token may be cryptographically verifiable by one or more components of the service provider 102 (e.g., the identity management service 110, an authorization service or another service) that verify the token for the purpose of enabling access to computing resources. Accordingly, the computing resource service provider 102 may provide the token to the applicable services where customer 104 may be managed and maintained. Thus, when a user 108 submits a request to perform one or more actions on any of the customer's 104 resources, the applicable service may refer to the temporary token and determine, based at least in part on the delegated access permissions for the user 108, whether the user 108 is authorized to perform the one or more actions. The temporary token may be configured to expire when the user 108 terminates his/her session with the computing resource service provider 102 network. Alternatively, the temporary token may be encoded with an expiration time. For instance, the temporary token may be configured to expire after a certain period of time after the temporary token was created. The one or more components of the computing resource service provider 102 (e.g., identity management service, authorization service or some other service) may enforce the encoded expirations. Accordingly, when the user 108 attempts to connect to the computing resource service provider 102 network at a later time, the computing resource service provider 102 may utilize the cookie from the user 108 to generate a new temporary token. While temporary tokens are used throughout the present disclosure for the purpose of illustration, the tokens need not be temporary. For example, the tokens generated by the identity management service 110 may be redundantly stored in a data store such that whenever a user 108 utilizes a cookie to access the computing resource service provider 102 to access one or more resources, the computing resource service provider 102 may obtain the token corresponding to this user 108 from the data store and provide the token to the relevant services.

Figure 2:
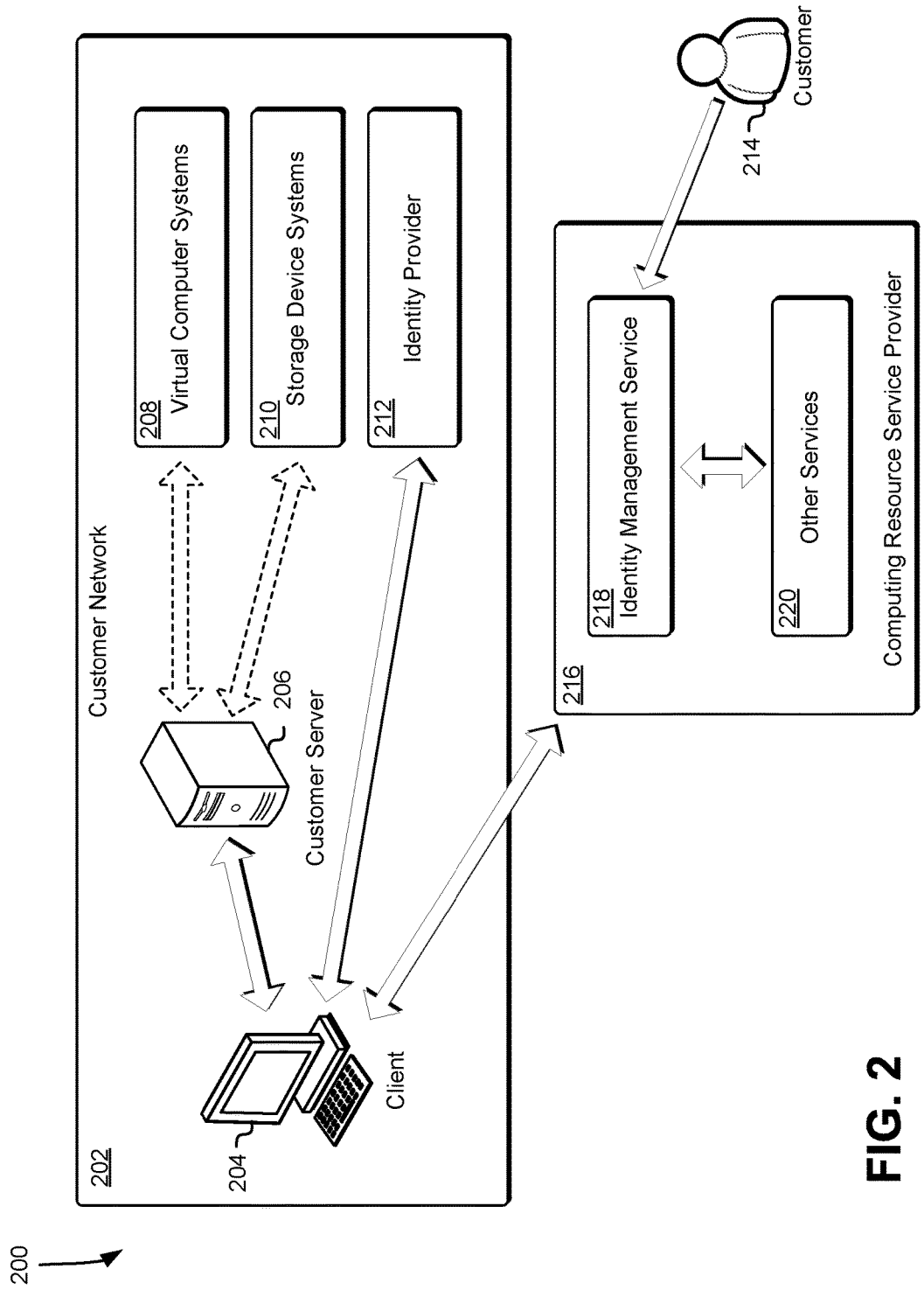
FIG. 2 shows an illustrative example of an environment in which user roles on a customer network are utilized to enable a user client to access services provided by a computing resource service provider in accordance with at least one embodiment.

As noted above, the computing resource service provider, through an identity management service, may utilize a mapping of user roles provided by a customer to define one or more delegated access permissions for the customer's resources. The mapping of user roles may specify one or more user identities within the customer network. Additionally, the mapping of user roles may further specify corresponding sets of one or more delegated access permissions or off-premises user roles for each user identity, usable to define a level of access to the customer's resource from within the computing resource service provider network. Thus, the mapping of user roles may map these user roles to corresponding sets of delegated access permissions or off-premises user roles. These delegated access permissions may be used to enable users utilizing one or more client devices connected to the customer's network to access these resources and, accordingly, perform one or more actions on these resources. Accordingly, FIG. 2 shows an illustrative example of an environment 200 in which user identities on a customer network 202 are utilized to enable a user client 204 to utilize a plugin installed on the user client 204 or integrated browser to access services provided by a computing resource service provider 216 in accordance with at least one embodiment. In the environment 200, a user may utilize a client 204 to access a customer server 206 within a customer network 202 to access one or more services provided by the customer 214. The client 204 may be a computing device configured to communicate, on behalf of a user, with a customer server 206 to access one or more systems provided by the customer 214 in the customer network 202. For instance, the client 204 may be a thin client configured to enable users of the client 204 to utilize one or more applications or graphical user interfaces (GUIs) to access these one or more systems to perform a series of operations. These operations may be requested by the user on behalf of the customer 214 to support the customer's 214 business needs. Additionally, the client 204 may be utilized by the customer 214 to access the customer network 202 to perform, among other things, administrative tasks with regard to one or more systems provided by the customer 214 in the customer network 202.

The customer network 202 may include a plurality of systems and other components, which may be used by users of the customer network 202 to perform one or more operations to support the customer's 214 needs. For instance, as illustrated in FIG. 2, the customer network 202 may include a customer server 206. The customer server 206 may include one or more computing hardware devices (e.g., hard drives, RAM, one or more processors, network devices, etc.) collectively configured to enable a user, through a client 204 to access one or more customer systems. For example, the customer server 206 may be configured to operate one or more virtual computer systems 208, storage device systems 210 and other systems within the customer network 202. The customer 214 may configure the customer server 206 to refer to one or more user roles when a user utilizes a client 204 to access the customer server 206. For instance, when the user utilizes the client 204 to provide one or more credentials to access the customer server 206 on the customer network 202, the customer server 206 may utilize these credentials to authenticate the user and identify, based at least in part on the user roles for this particular user, which systems the user may access.

The user may additionally use the client 204 to access, from the customer network 202, the computing resource service provider 216 to access customer 214 resources that may be made available off-premises (e.g., through a network managed by the computing resource service provider 216). In order to access the computing resource service provider 216, the user may utilize the client 204 to access one or more applications that may be used for establishing a connection to the computing resource service provider 216. When the user interacts with these one or more applications, the client 204 may transmit the request to access the computing resource service provider 216 to an identity provider 212 within the customer network 202 to obtain a security document that may be used to authenticate the user within the computing resource service provider 216 network. For instance, the security document may specify the identity of the particular user within the customer network 202 submitting the request to access the computing resource service provider 216 and an assertion of the user's authentication status within the customer network 202. This assertion may be used to verify the identity of the user. The security document may be created using one or more data formats, such as SAML, OpenID or any other data format that is readable by the computing resource service provider 216 and its corresponding components/services.

Once the user, through the user client 204, has received the security document from the identity provider 212, the user client 204 may provide the security document to the computing resource service provider 216 in order to authenticate the user within the computing resource service provider 216 network. If the user is successfully authenticated, the computing resource service provider 216 may utilize a mapping of user identities within the customer network 202 to one or more policies, usable for defining a level of access to one or more resources within the computing resource service provider 216 network, for each user identity and generate a cookie usable to provide information to a computing resource service provider 216 interface. The cookie may be a session cookie, a persistent cookie, an encrypted cookie or any other type of cookie that may be used to provide information regarding the policies for the particular user. Additionally, the cookie may include a digital signature, which may be used by the computing resource service provider 216 to verify the identity of the user and ensure the user has been properly authenticated through the customer network 202. The computing resource service provider 216 may transmit the newly generated cookie to the user client 204 to enable the user to access an interface provided by the computing resource service provider 216 to interact with one or more customer 214 resources.

When the user client 204 transmits, through the interface, a request to access one or more customer 214 resources, the user client 204 may provide the cookie to the computing resource service provider 216. Accordingly, the computing resource service provider 216 may utilize a cryptographic key to verify the digital signature included in the cookie to ensure the particular user has been authenticated and may obtain the one or more policies for the particular user within the customer network 202. The computing resource service provider 216 may access an identity management service 218 to transmit, such as through one or more API calls to the service, a request to the identity management service 218 to compare the received one or more policies to the existing policies, as defined by the customer 214, to determine if the received one or more policies are valid. If the received one or more policies are still valid, the identity management service 218 may utilize the policies to create one or more delegated access permissions for defining a level of access to one or more customer 214 resources within the computing resource service provider 216 network. Alternatively, if the received one or more policies are not valid, then the identity management service 218 may utilize the existing policies (such as through the mapping of user identities within the customer network 202 to policies) to generate a new cookie and provide this new cookie to the user client 204.

As noted above, a customer 214 may access the identity management service 218 to access his/her account to configure the account to enable use of security documents to obtain user identities within the customer network 202 from users accessing the computing resource service provider 216 from the customer network 202. Additionally, the customer 214 may store a mapping of user identities usable within the customer network 202 and corresponding policies for one or more customer resources within the one or more services provided by the computing resource service provider 216 such as described above. While the use of user identities and corresponding policies are used extensively throughout the present disclosure to illustrate the contents of the mapping provided by the customer 214, the mapping may be configured to include additional and/or alternative information. For example, the mapping provided by the customer 214 may not specify policies for the one or more customer resources within the one or more services provided by the computing resource service provider 216 but may instead include one or more user roles for each user identity within the customer network 202. This alternative mapping of user roles may thus map these user roles to other information, such as performable actions on the one or more resources maintained on the computing resource service provider 216 network. Accordingly, in such an instance, the identity management service 218 may be configured to utilize the mapping of user roles to perform one or more calculations to determine corresponding delegated access permissions.

Once the identity management service 218 has determined the corresponding delegated access permissions for the user based at least in part on the policies obtained from the cookie, the identity management service 218 may create a temporary token specifying these delegated access permissions. This temporary token may be provided to the computing resource service provider 216, which may transmit this temporary token to one or more other services 220 to enforce these delegated access permissions. For instance, if a user, through the user client 204, accesses the computing resource service provider 216 and attempts to perform one or more actions on a customer 214 resource within one of the other services 220 provided by the computing resource service provider 216, the applicable service may utilize the temporary token to identify the delegated access permissions for the user and determine whether the user is authorized to perform the one or more actions. Accordingly, the service may either allow or deny the user to perform these one or more actions based at least in part on the determination.

Figure 3:
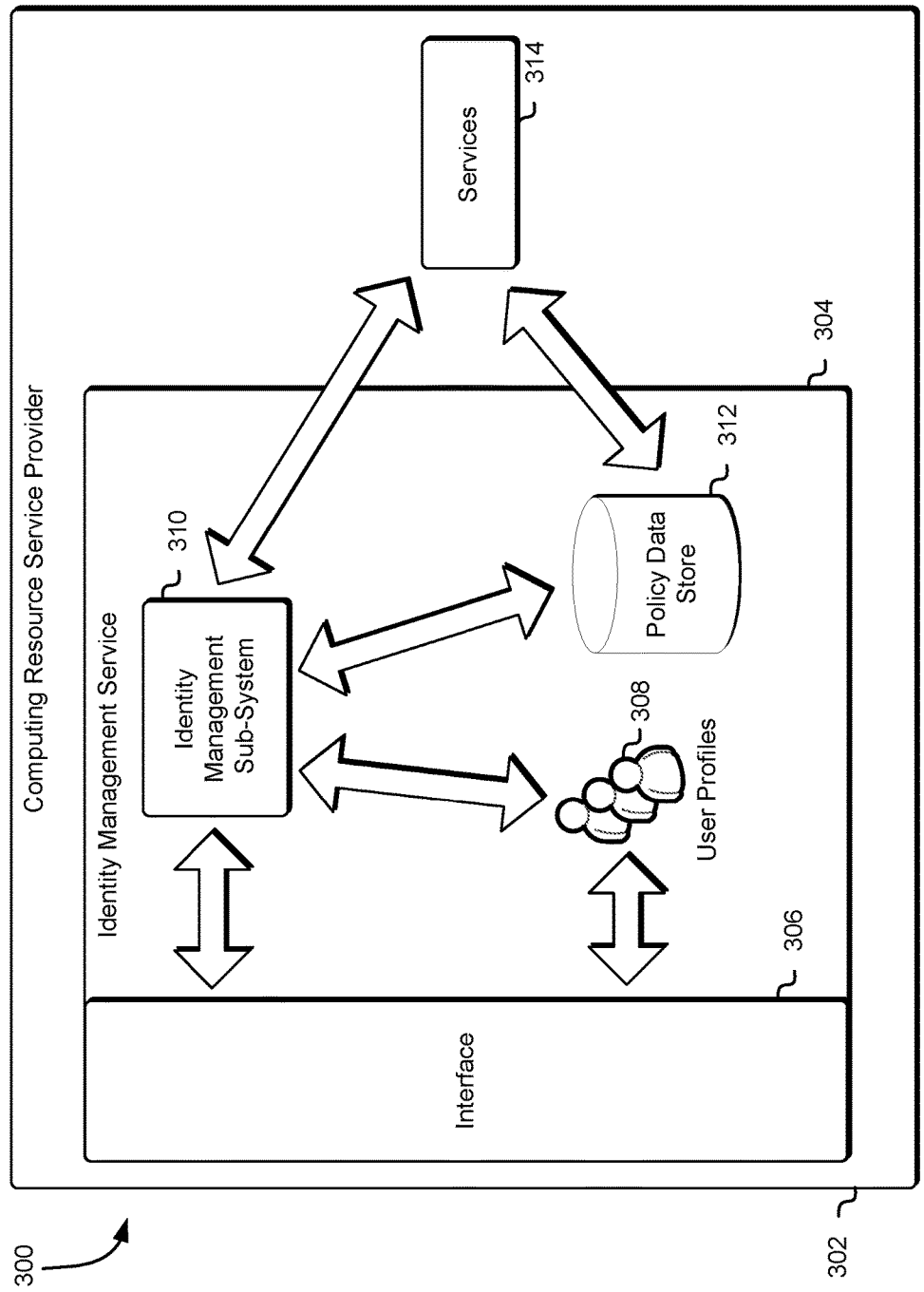
FIG. 3 shows an illustrative example of an environment that includes a plurality of components of an identity management service provided by a computing resource service provider in accordance with at least one embodiment.

As noted above, in some embodiments, a customer may utilize an identity management service, provided by the computing resource service provider, to access his/her customer account and configure the account to enable use of security documents. Additionally, the customer may store a mapping of user identities within the customer (e.g., on-premises) network to one or more policies defining a level of access to one or more resources or services provided by the computing resource service provider, which may be used to determine one or more delegated access permissions for users of the customer network attempting to access customer resources from the computing resource service provider network, as described above. Accordingly, FIG. 3 shows an illustrative example of an environment 300 that includes a plurality of components of an identity management service 304 provided by a computing resource service provider 302 in accordance with at least one embodiment. The identity management service 304 may provide customers and other delegated users who have been granted administrative permissions by a customer with an interface 306 that may enable the customer or a delegated user to access the identity management service 304. A customer or a delegated user may utilize the interface 306 through one or more communications networks, such as the Internet. The interface 306 may comprise certain security safeguards to ensure that the customer or delegated user has authorization to access the identity management service 304. For instance, in order to access the identity management service 304, a customer may need to provide a username and a corresponding password or encryption key when using the interface 306. Additionally, requests (e.g., API calls) submitted to the interface 306 may require an electronic signature generated using a cryptographic key such that the electronic signature is verifiable by the identity management service 304, such as by an authorization system (not shown).

The customer or delegated user may submit one or more requests to the interface 306 that may cause the interface 306 to enable the customer or delegated user to view his or her resources, including identifiers of all users authorized to access each of his or her resources. Accordingly, the customer or delegated user may use the interface 306 to access a user profile data store 308 to access his/her account to enable use of security documents to obtain user identities within the customer network for users utilizing a user client within a customer network to access the computing resource service provider 302. Additionally, through the interface 306, the customer or delegated user may access a policy data store 312 to store one or more mappings of user identities, as defined for the customer network, to one or more corresponding policies, which may be used to define a level of access to the customer's one or more resources within the one or more services 314 provided by the computing resource service provider 302. The location of the one or more mappings may be identified within the customer account in the user profile data store 308.

As noted above, when a user accesses the computing resource service provider 302 to access one or more services to interact with customer resources, the computing resource service provider 302 may obtain a cookie from the user client and, from the cookie, obtain the user's identity within the customer network and one or more policies for the particular user. Accordingly, the computing resource service provider 302 may transmit a request to the identity management service 304, such as through one or more API calls to the service, to determine whether the one or more policies encoded within the cookie are valid. The request may specify the user identity obtained from the cookie, the one or more policies, as well as other information usable to identify the appropriate customer account that includes an identifier for the location of the one or more mappings within the policy data store 312.

Once the identity management service 304 receives the request from the computing resource service provider 302 to determine whether the one or more policies encoded within the cookie are valid, an identity management sub-system 310 may access the user profile data store 308 to analyze the customer's account to identify the location of the one or more mappings usable to determine the one or more policies for the particular user. Subsequently, the identity management sub-system 310 may access the policy data store 312 to obtain the one or more mappings and determine whether the one or more policies encoded within the cookie are valid. For instance, if the one or more mappings specify that the one or more policies encoded within the cookie are no longer valid (e.g., the policies encoded within the cookie do not match the policies included in the mappings), the identity management sub-system 310 may generate a new cookie that encodes the policies as defined within the mappings and provide these to the user client. Alternatively, if the policies in the one or more mappings do match those encoded within the cookie for the user, the identity management sub-system 310 may utilize the policies to generate one or more delegated access permissions based at least in part on the policies.

The identity management sub-system 310 may generate one or more temporary tokens that specify the delegated access permissions for the particular user in response to the request from the computing resource service provider 302. Accordingly, the identity management sub-system 310 may provide the one or more temporary tokens to the computing resource service provider 302, which may subsequently provide these temporary tokens to one or more services 314 in order to enforce the delegated access permissions for the particular user. Alternatively, the identity management sub-system 310 may directly provide these temporary tokens to the one or more services 314 in response to the request from the computing resource service provider 302. As noted above, while temporary tokens are used extensively throughout the present disclosure for the purpose of illustration, the tokens need not be temporary and may be persistently stored within the policy data store 312. Thus, when a user accesses the computing resource service provider 302 from the customer network, the identity management service 304 may obtain the appropriate token from the policy data store 304 and provide the token to the one or more services 314.

Figure 4:
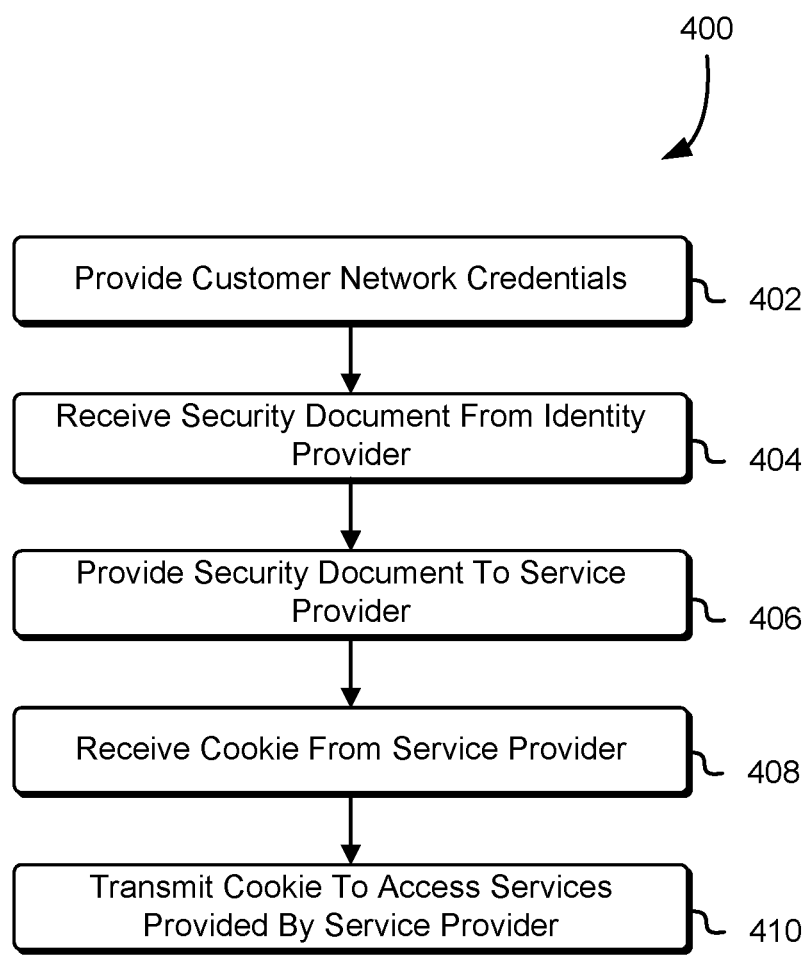
FIG. 4 shows an illustrative example of a process for accessing one or more services provided by a computing resource service provider from a customer network in accordance with at least one embodiment.

As noted above, a user may utilize a user client within a customer network to access one or more customer resources within a computing resource service provider network without the need for a second set of credentials for accessing the computing resource service provider network. Accordingly, FIG. 4 shows an illustrative example of a process 400 for accessing one or more services provided by a computing resource service provider from a customer network in accordance with at least one embodiment. The process 400 may be performed by a user client used by a user permitted to access a customer network and utilize one or more customer resources within this network to support the customer's business needs.

When a user utilizes a user client to access the customer network, the user may be required to verify his/her identity to the customer network. Accordingly, the user may provide 402, through the user client, one or more customer network credentials. These credentials may be used by a customer server within the customer network to authenticate the user and enable the user to perform one or more actions within the customer network based at least in part on one or more user roles defined by the customer. Additionally, if the user utilizes the user client to access the computing resource service provider, these credentials may be used, by an identity provider, to generate one or more security documents that may specify one or more user roles and other information usable to verify that the user has been properly authenticated by the customer network. In an alternative embodiment, the one or more security documents are generated without specifying the one or more user roles for the user within the customer network. Accordingly, the one or more security documents may only specify information that is usable to verify that the user has been authenticated by the customer network.

In another alternative embodiment, the one or more security documents specify one or more user roles within the off-premises (e.g., computing resource service provider) network. For instance, the identity provider may access one or more databases or a managed directory within the customer network to identify the one or more user roles within the off-premises network for this particular user. These user roles may be used to enable the user to perform one or more actions within the computing resource service provider network that may affect the customer's resources. In some embodiments, customers are able to author and maintain, in the customer network, policies on computing resources hosted by the computing resource service provider, where the policies define permissions for the computing resources. The policies may be authored in a declarative access control policy language, such as eXtensinble Access Control Markup Language (XACML), Enterprise Privacy Authorization Language (EPAL), Amazon Web Services Access Policy Language, Microsoft SecPol or any suitable way of encoding one or more conditions that must be satisfied for a request whose fulfillment includes access to one or more computing resources hosted by the computing resource service provider to be fulfillable. Such policies may be stored in a database accessible to the on-premises identity provider or otherwise maintained so as to be accessible to the identity provider.

Accordingly, the user, through the user client, may receive 404 a security document from the identity provider. The security document may be created using one or more data formats, such as SAML, OpenID or any other data format that is readable by the computing resource service provider and its corresponding components/services. Additionally, the security document may specify one or more user roles for and/or permissions (e.g., by including one or more policies) applicable to the particular user, as well as a digital signature, which may be used by the computing resource service provider to validate the security document. For instance, the computing resource service provider may utilize a public cryptographic key to verify the digital signature attached to the security document and obtain a hash value. Further, the computing resource service provider may utilize a hash function to hash the security document and obtain a second hash value. If these hash values match, then the digital signature may be deemed to be valid. Alternatively, if the hash values do not match, then the digital signature may not be valid and the security document may be rejected by the computing resource service provider.

Once the user client has received the security document from the identity provider, the user client may access the computing resource service provider to provide 406 the security document to the computing resource service provider. Accordingly, the computing resource service provider may verify the security document and ensure that the user has been authenticated by the customer network. For instance, if the security document includes a digital signature, the computing resource service provider may utilize a public cryptographic key to verify and validate the digital signature. If the security document is valid, the computing resource service provider may specify the user roles from the security document in a cookie usable when accessing an interface provided by the computing resource service provider to access one or more resource services. Accordingly, the computing resource service provider may transmit this newly created cookie to the user client for later use.

As noted above, in some embodiments, the security document does not specify the one or more user roles for the particular user. The computing resource service provider may utilize the authentication information specified within the security document (e.g., user identifier) to access a database to identify one or more roles (e.g., one or more permissions or sets of permissions) for the user within the off-premises network. For instance, the database may include a mapping of user roles within the off-premises network that maps the user's identity within the customer network to the one or more user roles within the off-premises network and the applicable one or more customer resources within the off-premises network. The computing resource service provider may generate a policy for the user based at least in part on the mapping and specify these user roles in a cookie usable when accessing an interface provided by the computing resource service provider to access one or more resource services.

In another embodiment, the security document specifies one or more user roles (or generally, specifying a set of permissions where the permissions may be specified by role, by policy, by an identifier usable to lookup the permissions in a data store or otherwise) for the user within the off-premises network that may be granted to the user. For instance, the customer network may maintain one or more databases, which an identity provider, responsible for generating the security document, may access to identify the one or more user roles for the user within the off-premises network that are to be included in the security document. Accordingly, when the computing resource service provider receives this security document, the computing resource service provider may compare the first set of permissions from the security document with a second set of permissions maintained in one or more databases within the off-premises network to determine whether the sets of permissions match. If there is a match, the computing resource service provider may encode the set of permissions within a cookie. If the sets of permissions do not match, however, the computing resource service provider may perform a reconciliation process to define a single set of permissions that may be granted to the user and encoded within the cookie. Alternatively, if the sets of permissions do not match, the computing resource service provider may not create the cookie and reject the security document. A reconciliation process may utilize one or more rules for resolving conflicts among multiple sets of permissions. For example, a rule may require that, in the event of a conflict between permissions managed on customer premises and permissions managed in a service provider computing environment, the permissions in the service provider computing environment are used (or vice versa). As another example, a rule may require that, in the event of a conflict between permissions managed on customer premises and permissions managed in a service provider computing environment, the most restrictive permissions are used. Other examples are also considered as being within the scope of the present disclosure.

As a result of the computing resource service provider having transmitted the cookie to the user client, the user client may receive 408 the cookie and may persistently store the cookie for use in accessing the interface provided by the computing resource service provider. Subsequently, the user may utilize the user agent to access this interface to connect to the computing resource service provider network. For instance, the user client may include a browser application, which the user may utilize to enter a particular URL directed towards the computing resource service provider interface. When the user uses the browser application to submit this URL, the user client may contact a domain name system (DNS) server to get a corresponding Internet Protocol (IP) address for the interface. Accordingly, the user client may establish a connection with the computing resource service provider network to send data to the computing resource service provider and receive data from the computing resource service provider.

Once the connection has been established between the user client and the computing resource service provider, the user client may transmit 410 the cookie to the computing resource service provider to access one or more services provided by the computing resource service provider. For instance, as noted above, the computing resource service provider may utilize the cookie to obtain the user roles for the particular user and transmit a request to an identity management service to obtain delegated access permissions corresponding to these user roles. These delegated access permissions may be used by the computing resource service provider to define a level of access to one or more services provided by the computing resource service provider in order to interact with one or more customer resources within the computing resource service provider network. Additionally, the identity management service may utilize the policies specified directly or indirectly in the cookie and compare these to one or more policies m by the computing resource service provider. If the permissions do not match, the identity management service may perform one or more reconciliation processes to define a single set of permissions that may be used to create the delegated access permissions.

Figure 5:
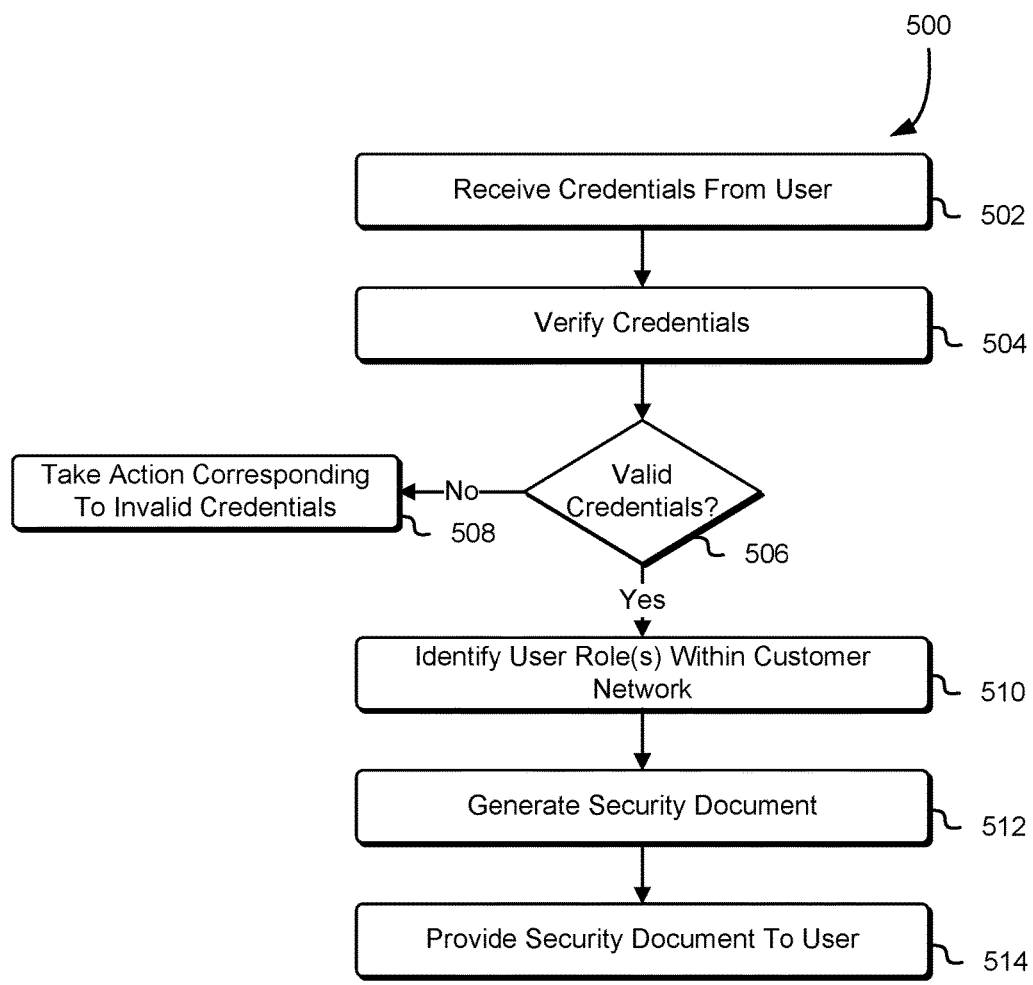
FIG. 5 shows an illustrative example of a process for providing a security document to a user for verifying user authentication by a computing resource service provider in accordance with at least one embodiment.

As noted above, the customer network may include an identity provider, which may be configured to utilize user roles for a particular user to generate a security document usable for verifying the authenticity of a user within other networks. Accordingly, FIG. 5 shows an illustrative example of a process 500 for providing a security document to a user for verifying user authentication by a computing resource service provider in accordance with at least one embodiment. The process 500 may be performed by an identity provider within a customer network configured to generate security documents based at least in part on a user's authentication status within the customer network for use in connecting to other networks, such as a computing resource service provider network.

When a user utilizes a user client to access the customer network, the user may be required to verify his/her identity to the customer network. The user may provide a set of credentials that may be utilized to verify the user's identity and enable the user to access the customer network. These credentials may include a username and a corresponding password or encryption key. The identity provider may receive 502 these credentials from the user and, accordingly, attempt to verify 504 these credentials to ensure that the user is permitted to access the customer network. Verification of these credentials may include, in some embodiments, accessing a user account database to compare the received set of credentials to expected values for these credentials. For example, the identity provider may utilize the user's username as an identifier to find a user account entry within the database to identity a corresponding password. If the password provided by the user does not match the corresponding password specified in the database, then the user's provided credentials may not be valid. In this manner, the identity provider may be able to determine 506 whether the user has provided a valid set of credentials and, accordingly, determine whether the user may be authenticated.

If the user has not provided a valid set of credentials, the identity provider may take 508 one or more actions corresponding to the detection of invalid credentials. For instance, the identity provider may transmit one or more notifications to the user client that may cause the user client to display an error message indicating that the provided set of credentials do not match expected values. Accordingly, the identity provider may enable the user to try to provide a valid set of credentials. Alternatively, the identity provider may be configured to terminate the user's connection to the customer network if the user has provided invalid credentials a certain number of times. For instance, the identity provider may be configured to terminate the user's connection to the customer network if the user has provided invalid credentials a single time or a certain number of times, as defined by the customer or other administrator of the customer network.

If the identity provider is able to verify the user's credentials and, as a result, authenticate the user within the customer network, the identity provider may identify 510 the user's one or more user roles within the customer network. As noted above, a customer or other administrator of the customer network may define one or more user roles for each user that accesses the customer network. For instance, the customer network may include one or more systems (e.g., virtual computer systems, data storage systems, etc.) that may be accessed through a customer server to support the customer's business needs. Accordingly, a customer or other administrator of the customer network may define which systems the user may access, as well as the actions the user may perform within these systems. These user roles may be redundantly stored on a customer server within the customer network. Thus, the identity provider may access this customer server to obtain the user roles for this particular user.

Once the identity provider has identified the user's user roles within the customer network, the identity provider may generate 512 a security document for the user. As noted above, the security document may specify one or more of the user's user roles and/or permissions, as well as other components that may be necessary to show that the user has been properly authenticated within the customer network. For instance, the identity provider may utilize a private cryptographic key of a cryptographic key pair to digitally sign the security document. This may enable another network, which may have been provided a public cryptographic key by the customer or other administrator of the customer network, to verify the digital signature and ensure the security document is valid. The security document may further specify other user information, which may be required by other networks to track the user's activities and identify user permissions within these other networks (e.g., in an off-premises network hosted by a computing resource service provider). The security document may be created using one or more data formats, such as SAML, OpenID or any other data format that is readable by a computing resource service provider and its corresponding components/services or any other network. Once the security document has been created by the identity provider, the identity provider may provide 514 the security document to the user, which the user may utilize as part of a request to access an off-premises network environment.

It should be noted that, in some embodiments, the process 500 may be performed utilizing alternative, additional or fewer actions by the identity provider. For instance, in an embodiment, the identity provider generates 512 the security document for the user without specifying the one or more user roles for the user. For example, as noted above, the computing resource service provider may utilize the authentication information specified within the security document (e.g., user identifier) to access a database to identify one or more roles for the user within the off-premises network. Accordingly, the security document may only need to include information sufficient to verify, by the computing resource service provider, that the user has been authenticated within the customer network. Thus, the identity provider may not be required to identify 510 the user's one or more user roles within the customer network. In another embodiment, as an alternative to identifying 510 the user's one or more user roles within the customer network, the identity provider will access one or more databases or a managed directory within the customer network to identify one or more permissions or sets of permissions for the user within the off-premises network that are to be included in the security document. Accordingly, the identity provider may generate 512 the security document for the user that specifies these one or more permissions or sets of permissions for the user.

Figure 6:
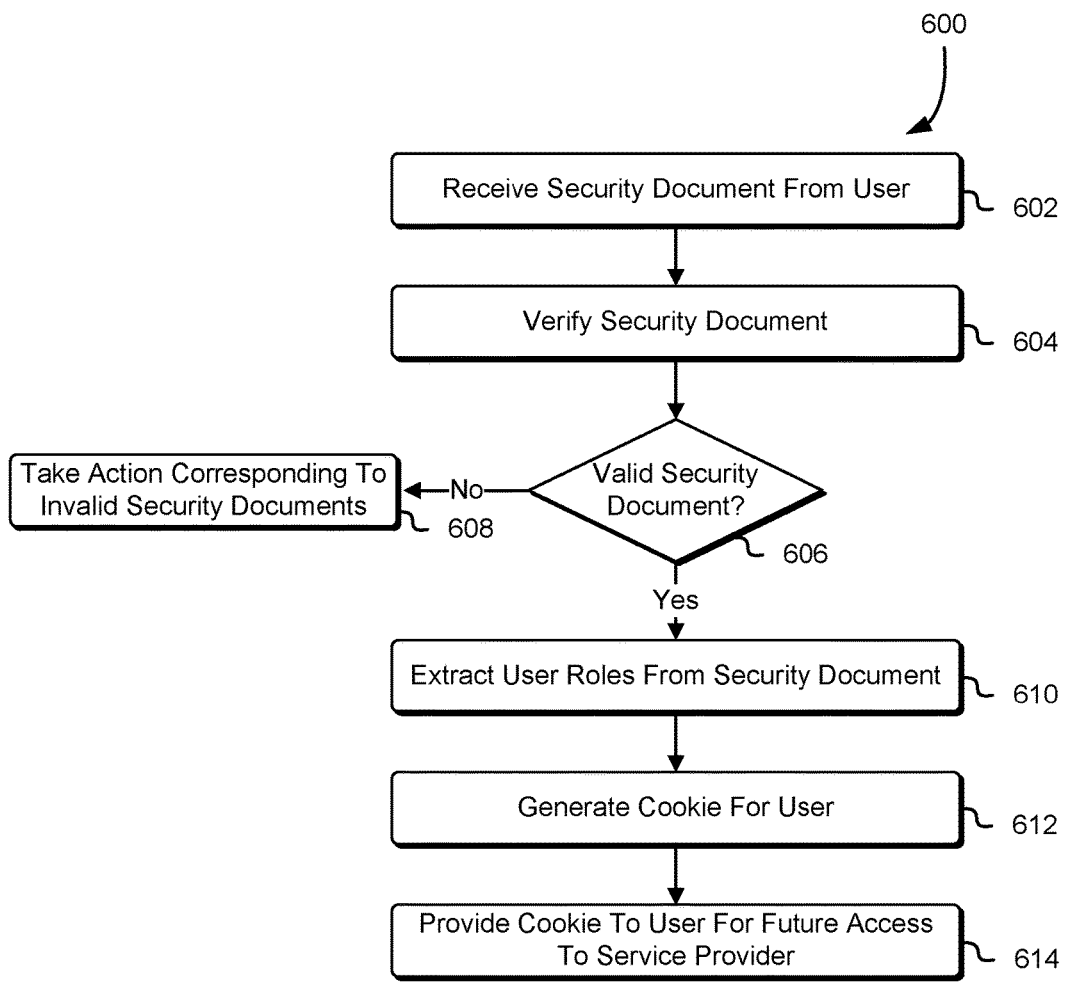
FIG. 6 shows an illustrative example of a process for providing a cookie to a user for accessing one or more services provided by a computing resource service provider in accordance with at least one embodiment.

As noted above, the computing resource service provider may be able to authenticate a user from a customer network by examining the user's security document. The computing resource service provider may then generate a cookie for the user, which may enable the user to access an interface provided by the computing resource service provider to interact with one or services maintained on the computing resource service provider network. Accordingly, FIG. 6 shows an illustrative example of a process 600 for providing a cookie to a user for accessing one or more services provided by a computing resource service provider in accordance with at least one embodiment. The process 600 may be performed by the computing resource service provider using one or more services or other components. For instance, the computing resource service provider may utilize an identity management service to receive the security document, identify the customer account associated with the customer network and utilize one or more settings from the customer account to utilize the security document to authenticate the user.

As noted above, a user within a customer network may utilize a user client to transmit a security document to a computing resource service provider to demonstrate that the user has been properly authenticated within the customer network and should be granted access to one or more customer resources. Accordingly, the computing resource service provider may receive 602 a security document from the user. The security document may specify one or more user roles for the user as defined by the customer or other administrator of the customer network. These user roles may correspond to one or more access rights to resources and services provided within the customer network or to one or more access rights to resources and services provided by the computing resource service provider. Alternatively, the security document may not specify these user roles. Additionally, the security document may include a digital signature, which may be used to verify the authenticity of the security document. The security document may specify other information, such as user information and information regarding the customer or other administrator of the customer account, which may be used to identify a customer account within the computing resource service provider network.

Once the computing resource service provider has received the security document from the user, the computing resource service provider may verify 604 the security document to determine 606 whether the received security document is valid. For instance, the security document may include a digital signature comprising an encrypted hash of the security document created using a private cryptographic key of a public-private cryptographic key pair. The customer, through the customer account, may provide the computing resource service provider with a public cryptographic key usable to verify the digital signature. Accordingly, the computing resource service provider may utilize the public cryptographic key to decrypt the digital signature and obtain a first hash value for the security document. The computing resource service provider may then utilize a hash function to hash the received security document to obtain a second hash value. If the two hash values match, then the security document may be deemed to be valid. However, if the two hash values do not match, then the security document may not be valid and, as a result, may be rejected by the computing resource service provider.

If the security document received from the user is deemed to not be valid, the computing resource service provider may take 608 one or more actions corresponding to detection of an invalid security document. For instance, the computing resource service provider may terminate the connection between the user and the computing resource service provider network, thus preventing user access to one or more resources maintained by the computing resource service provider. Additionally, or alternatively, the computing resource service provider may transmit one or more notifications to the customer and/or any other administrator of the customer network to inform them of a potential issue concerning this particular user. Accordingly, this may enable the customer or other administrator of the customer network to take remedial actions to address the issue.

If the security document received from the user is deemed to be valid, the computing resource service provider may extract 610 the one or more user roles and/or permissions from the security document. As noted above, the security document may specify one or more user roles for the particular user within the customer network. These user roles may be utilized to define a level of access to resources and/or systems within the computer system. These resources and/or systems may be analogous to the resources and services provided by the computing resource service provider and, thus, may be used to define a level of access to customer resources within the computing resource service provider network, as will be described in greater detail below. Alternatively, the security document may specify one or more user roles for the particular user within the off-premises network. These user roles may be utilized to define a level of access to resource provisioned by the customer and/or services provided by the computing resource service provider. As noted, a set of permissions may be extracted from the security document in addition to or instead of the one or more roles. The permissions may be in the form of one or more policy documents that encode one or more policies applicable to the user for access of one or more computing resources hosted by the computing resource service provider. In some embodiments, the security document may not specify any user roles and/or permissions, in which case the computing resource service provider may not be able to extract 610 the one or more user roles from the security document.

Once the computing resource service provider has extracted the user roles from the security document, the computing resource service provider may generate 612 a cookie for the user, which the user may utilize to access an interface provided by the computing resource service provider and provide information from the cookie to the interface as required. The cookie may specify the user roles defining permissions for the user within the customer network or within the computing resource service provider network, as well as other information that may be used by the computing resource service provider to verify the authentication of the user within the customer network. The cookie may also encode a set of policies, which may include one or more policies from the security document that was received and/or one or more policies maintained by the computing resource service provider. Alternatively or in addition, the cookie may only include an identifier for the user and other information that may be used by the computing resource service provider to verify the authentication of the user within the customer network. While a cookie is used extensively throughout the present disclosure for the purpose of illustration, other tokens and data files may be created, which may enable a user to access the interface provided by the computing resource service provider. Once the cookie has been generated for the user, the computing resource service provider may provide 614 the cookie to the user, through the user client, for use in accessing the computing resource service provider network in a future instance.

Figure 7:
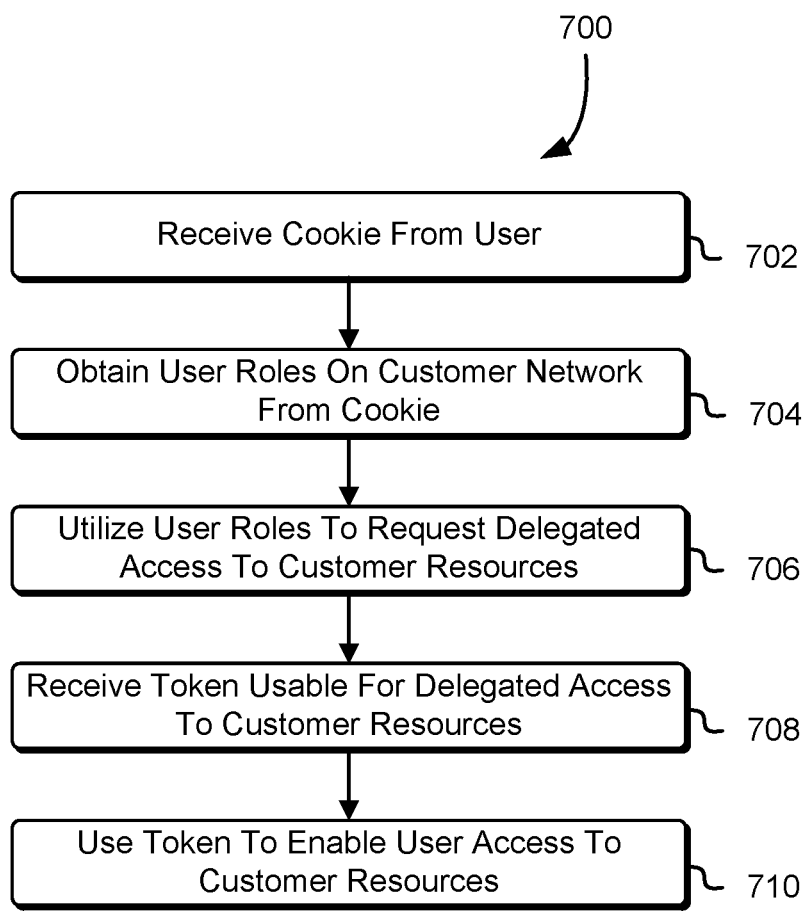
FIG. 7 shows an illustrative example of a process for utilizing a cookie from a user to define delegated access to one or more customer resources in accordance with at least one embodiment.

As noted above, an identity management service provided by the computing resource service provider may utilize user roles and/or permissions specified within a cookie to identity analogous delegated access permissions for a user within the computing resource service provider network. These delegated access permissions may define a level of access to one or more customer resources maintained by the computing resource service provider through one or more services. Accordingly, FIG. 7 shows an illustrative example of a process 700 for utilizing a cookie from a user to define delegated access to one or more customer resources in accordance with at least one embodiment. The process 700 may be performed by the computing resource service provider, configured to obtain one or more cookies from a user to obtain one or more user roles and utilize these one or more user roles to request one or more delegated access permissions usable within the computing resource service provider network. Alternatively or additionally, the computing resource service provider may be configured to utilize an identifier for the user, included within the cookie, to identify these one or more user roles from an identity management service, should the cookie not include these one or more user roles.

When a user utilizing a user client within the customer network submits a request to access the computing resource service provider network, the user client may provide, with the request, a cookie specifying an assertion of the security document used to generate the cookie. For instance, the cookie may specify the one or more user roles for the particular user within the customer network or, alternatively, one or more user roles for the particular user within the computing resource service provider network. In an alternative embodiment, the cookie does not specify any of these one or more user roles and includes an identifier for the user, which may be used to identify one or more permissions or sets of permissions for accessing customer resources maintained by the computing resource service provider. Additionally, the cookie may specify a URL of where the computing resource service provider interface may be located within the computing resource service provider network. Thus, when a user accesses the computing resource service provider, through the interface, the computing resource service provider may receive 702 this cookie from the user, through the user client.

As noted above, the cookie may specify one or more user roles and/or permissions for the particular user within the customer network. Accordingly, the computing resource service provider may obtain 704 the one or more user roles (defining a level of access to resources within the customer network) and/or permissions from the received cookie. The computing resource service provider may utilize 706 these user roles and/or permissions to submit a request, to an identity management service within the computing resource service provider network, to determine one or more delegated access permissions to the customer's resources. The request may be transmitted to the identity management service utilizing one or more API calls to the service. Additionally, the request may specify the one or more user roles obtained from the cookie, as well as other information that may be used to identify the customer account comprising information regarding the customer or other administrator responsible for managing the customer network.

Figure 9:
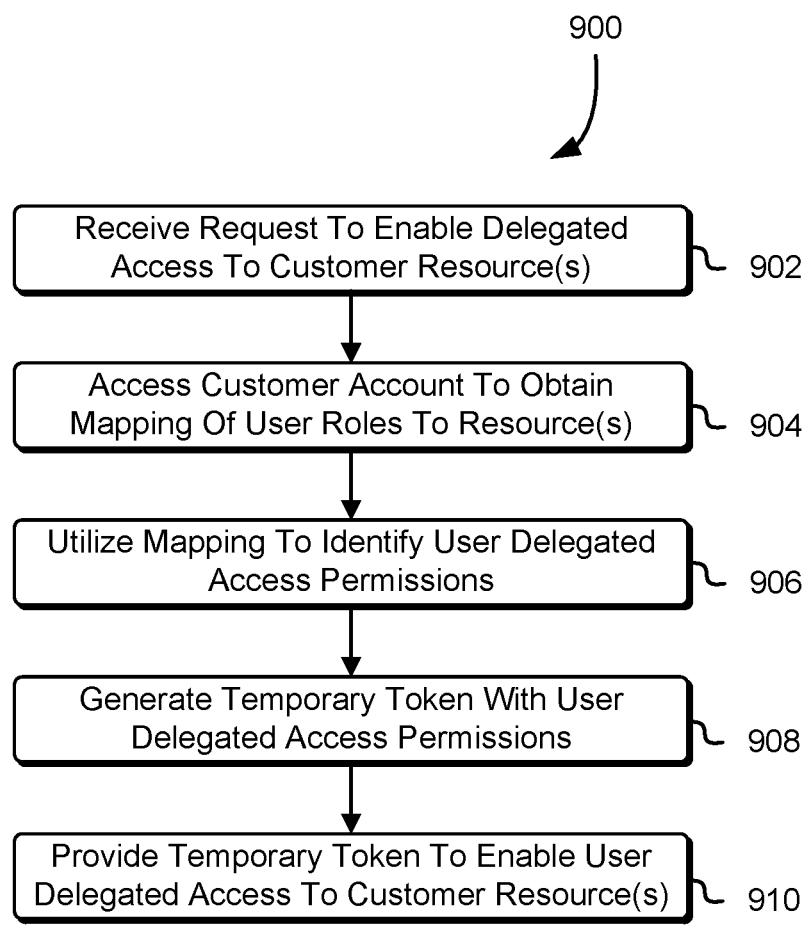
FIG. 9 shows an illustrative example of a process for enabling user delegated access to one or more customer resources based at least in part on a user request comprising a cookie in accordance with at least on embodiment.

The identity management service, as will be described in greater detail below in connection with FIG. 9, may be configured to access the customer account to obtain a mapping of user roles as defined within the customer network. This mapping may further specify analogous delegated access permissions that may be defined based at least in part on the user roles and their corresponding affected resources or computer systems. For instance, if a user role is used to define a level of access to one or more data storage systems within the customer network, the mapping may specify this user role and may further specify that a delegated access permission corresponding to this user role should enable the particular user to access one or more data storage services provided by the computing resource service provider to access the customer's resources. Alternatively, if the mapping of user roles does not specify corresponding delegated access permissions for the customer's resources, the identity management service may utilize one or more heuristics to generate these delegated access permissions based at least in part on the specified user roles.

If the cookie includes one or more user roles for the user within the computing resource service provider network, the computing resource service provider may still utilize 706 these user roles to submit a request, to an identity management service within the computing resource service provider network, to obtain one or more delegated access permissions to the customer's resources. However, the identity management service may utilize these user roles to create the one or more delegated access permissions without having to access a mapping of user roles as defined within the customer network, as the user roles included within the cookie may correspond to a level of access to customer resources within the computing resource service provider network. Alternatively, the identity management service may compare the one or more user roles from the cookie to an alternate version of the mapping of user roles to determine if there are one or more discrepancies. This alternate version of the mapping of user roles may specify the delegated access permissions for each user of the customer network that may be granted access to the computing resource service provider network. If there are any discrepancies, the identity management service may perform one or more reconciliation operations to define a single set of permissions (e.g., delegated access permissions) for the particular user. Alternatively, if there are any discrepancies, the identity management service may not create the delegated access permissions and deny the cookie.

Once the identity management service has created one or more delegated access permissions for the particular user based at least in part on the defined user roles, the identity management service may generate a temporary token specifying these delegated access permissions and provide this temporary token to the computing resource service provider. Accordingly, the computing resource service provider may receive 708 the temporary token usable for delegated access to customer resources from the identity management service. The computing resource service provider may subsequently use 710 the temporary token to enable the user to access the customer's resources. For instance, the computing resource service provider may provide the temporary token to the applicable one or more services wherein the customer's resources may be located. Accordingly, the applicable one or more services may utilize the temporary token to enforce the delegated access permissions specified therein. Alternatively, the computing resource service provider may redundantly store the temporary token within a repository accessible by the one or more services maintained by the computing resource service provider. Thus, when a user attempts to access the one or more services to interact with the customer's resources, the one or more services may access this repository, identify the applicable temporary token and determine whether the user has sufficient access permissions to interact with the target resources.

Figure 8:
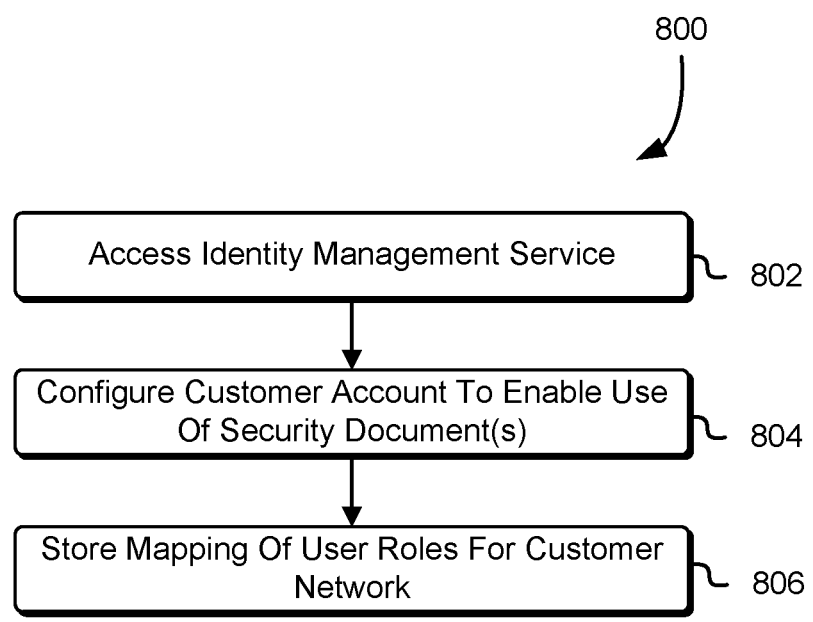
FIG. 8 shows an illustrative example of a process for configuring a customer account to enable use of security documents from users to define delegated access to customer resources in accordance with at least one embodiment.

As noted above, a customer or other administrator of the customer network may access the customer's account within the identity management service provided by the computing resource service provider to enable use of security documents by the users of the computer network and to also provide a mapping of user roles, which may be used to define a level of access to the customer's resources within the computing resource service provider network. Accordingly, FIG. 8 shows an illustrative example of a process 800 for configuring a customer account to enable use of security documents from users to define delegated access to customer resources in accordance with at least one embodiment. The process 800 may be performed by a customer or other administrator of the customer network. The customer or administrator may have access to the customer's account within the identity management service and may be required to have full access to the account and the one or more customer resources maintained on the computing resource service provider network.

In order to enable users of a customer network to connect with the computing resource service provider network, the customer or other administrator of the customer network may be required to specify, through a customer account, that other users may be permitted to utilize one or more customer resources maintained within the computing resource service provider network. For instance, the customer may utilize one or more resources provided by the computing resource service provider to operate one or more customer environments off-premises (e.g., separate from the customer network). Accordingly, the customer or other administrator of the customer may access 802 the identity management service, provided by the computing resource service provider, to configure 804 the customer account to enable use of security documents. As noted above, a user of the customer network may, through a user client connected to the customer network, transmit one or more security documents to the computing resource service provider. The security document may specify one or more user roles for the particular user that may be used to define a level of access to one or more resources and/or systems maintained by the customer on the customer network. Additionally, the security document may specify other user information usable to verify that the user has been authenticated within the customer network.

As a result of the customer or other administrator of the customer network having configured the customer account to enable use of security documents, the computing resource service provider may be able to utilize security documents from users of the customer network to obtain user roles from the security document and generate one or more cookies. These cookies may enable users of the customer network to access a computing resource service provider interface, which may be used to access one or more services provided by the computing resource service provider. Additionally, the customer or other administrator of the customer network may provide, through the customer account, the computing resource service provider with a public cryptographic key (e.g., digital certificate) of a public-private cryptographic key pair, which the computing resource service provider may use to verify the validity of any security document provided by users of the customer network.

Once the customer or other administrator of the customer network has configured the customer account to enable use of one or more security documents, the customer or other administrator of the customer network may store 806 a mapping of user roles for the customer network within the customer account or a separate repository (e.g., policy data store, as illustrated in FIG. 3) provided by the computing resource service provider. The mapping of user roles may specify one or more user roles that may be utilized within the customer network to define a level of access to one or more resources within the customer network. Additionally, the mapping of user roles may further specify one or more delegated access permissions, usable to define a level of access to customer resources within the computing resource service provider network, which may correspond to the listing of the one or more user roles. For instance, if a user role is used to enable a user within the computer network to utilize a virtual computer system to perform one or more read operations, a corresponding delegated access permission may be created to enable a user to perform one or more read operations on customer resources within a virtual computer system service provided by the computing resource service provider. In some embodiments, the mapping of user roles may not specify the corresponding delegated access permissions. Accordingly, the identity management service, provided by the computing resource service provider, may utilize one or more heuristics or other algorithms to determine what delegated access permissions should be granted to a user based at least in part on the user roles.

In an embodiment, the customer, instead of storing 806 a mapping of user roles for the customer network within the customer account or a separate repository provided by the computing resource service provider, can store a database comprising identifiers for one or more users of the customer network. Additionally, this database may further comprise a second set of permissions for each of the one or more users of the customer network. Thus, the identity management service, provided by the computing resource service provider, may compare the user roles, utilized to access one or more resources within the computing resource service provider network, within the security document to this second set of permissions to determine if there is a match. If there is no match, the identity management service may perform one or more reconciliation processes to define a single set of permissions for the user and specify these permissions within the cookie.

As noted above, the identity management service provided by the computing resource service provider may be configured to generate one or more temporary tokens usable to enforce one or more delegated access permissions for enabling users of a customer network to access customer resources within the computing resource service provider network. Accordingly, FIG. 9 shows an illustrative example of a process 900 for enabling user delegated access to one or more customer resources based at least in part on a user request comprising a cookie in accordance with at least on embodiment. The process 900 may be performed by the aforementioned identity management service, which may be configured to receive requests from the computing resource service provider to generate one or more temporary tokens specifying delegated access permissions and to provide said temporary tokens to the computing resource service provider in response to the request.

When a user of a customer network utilizes, through a user client, a cookie to access the computing resource service provider to interact with one or more customer resources, the computing resource service provider may extract one or more user roles from the cookie. As noted above, these user roles may be used within the customer network to define a level of access to one or more customer resources or systems provided by the customer within the customer network. Thus, these user roles may be used to define one or more analogous delegated access permissions for accessing customer resources within the computing resource service provider network. Accordingly, the identity management service may receive 902 a request from the computing resource service to enable delegated access to one or more customer resources for the user. The request may include the one or more user roles extracted from the cookie, as well as other information that may be used to identify the customer account necessary to obtain data for fulfilling the request.

As noted above, the cookie, in some embodiments, may not include the one or more user roles and may only include a user identifier and other information necessary to verify that the user has been authenticated within the customer network. If the cookie does not include the one or more user roles, the request may only include the user identifier, which may be used to identify the one or more delegated access permissions for the user. The identity management service may be configured to access a database comprising one or more delegated access permissions for each user specified by the customer and utilize the user identifier to obtain these permissions.

Once the identity management service has received the request from the computing resource service provider, the identity management service may access 904 the customer account to obtain a mapping of user roles to the customer's one or more resources. As noted above, the customer or other administrator of the customer network may access the customer account within the identity management service to store a mapping of user roles to the customer's one or more resources. The mapping of user roles may specify one or more user roles that may be utilized within the customer network to define a level of access to resources and/or computer systems managed by the customer on the customer network. Additionally, the mapping of user roles may further specify corresponding one or more delegated access permissions usable to define a level of access to the customer's resource from within the computing resource service provider network. While the customer account is used extensively throughout the present disclosure to illustrate the location of the mapping of user roles, the mapping of user roles may be redundantly stored in a repository managed by the identity management service that includes one or more policy documents and other documents for defining a level of access to resources within the computing resource service provider network. If the user roles included within the cookie correspond to a level of access to customer resources maintained by the computing resource service provider, the identity management service may not be required to access 904 the customer account to obtain the mapping of user roles to the customer's one or more resources.

In an embodiment, if the user roles included within the cookie correspond to a level of access to customer resources maintained by the computing resource service provider, the identity management service may compare these user roles to an existing policy to determine whether any differences exist between these user roles and the existing policy. If no differences exist, the identity management service may enable the user that submitted the request and the cookie to access one or more services provided by the computing resource service provider. However, if differences do exist (e.g., the policy has been updated since the creation of the cookie), the identity management service may generate a new cookie that includes the one or more user roles included in the updated policy and provide said new cookie to the user for use in accessing the one or more services provided by the computing resource service provider.

Once the mapping of user roles to one or more customer resources has been located, the identity management service may utilize 906 the mapping to identify one or more delegated access permissions for the user. As noted above, the mapping of user roles may specify corresponding one or more delegated access permissions usable to define a level of access to the customer's resource from within the computing resource service provider network. Accordingly, the identity management service may utilize the obtained user roles from the request to find, within the mapping, the corresponding delegated access permissions that should be created based at least in part on the obtained user roles.

Alternatively, if the mapping of user roles does not specify the corresponding one or more delegated access permissions, the identity management service may utilize one or more heuristics or algorithms to determine, based at least in part on the mapping of user roles and the obtained one or more user roles, one or more appropriate delegated access permissions for the user.

With the delegated access permissions for the user identified, the identity management service may generate 908 a temporary token specifying the one or more delegated access permissions for the user. The temporary token may be generated using one or more data formats that may be readable by the computing resource service provider and its subordinate services. Once the temporary token has been generated, the identity management service may provide 910 this temporary token to the computing resource service provider to enable user delegated access to the one or more applicable customer resources. For instance, the computing resource service provider may transmit this temporary token to the one or more applicable services such that, if a user submits a request to access one or more customer resources within a particular service, the service may refer to the temporary token to determine whether the user is authorized to perform the requested actions. While temporary tokens are used extensively throughout the present disclosure to define a level of access to one or more customer resources within a computing resource service provider network, the token need not be temporary. For instance, the identity management service may generate an individual policy for the user that may be redundantly stored within the data store. Thus, whenever the user accesses the computing resource service provider network to perform one or more actions on customer resources, the applicable service may access the policy data store, identify the applicable policy and allow or deny the requested action based at least in part on the policy.

Figure 10:
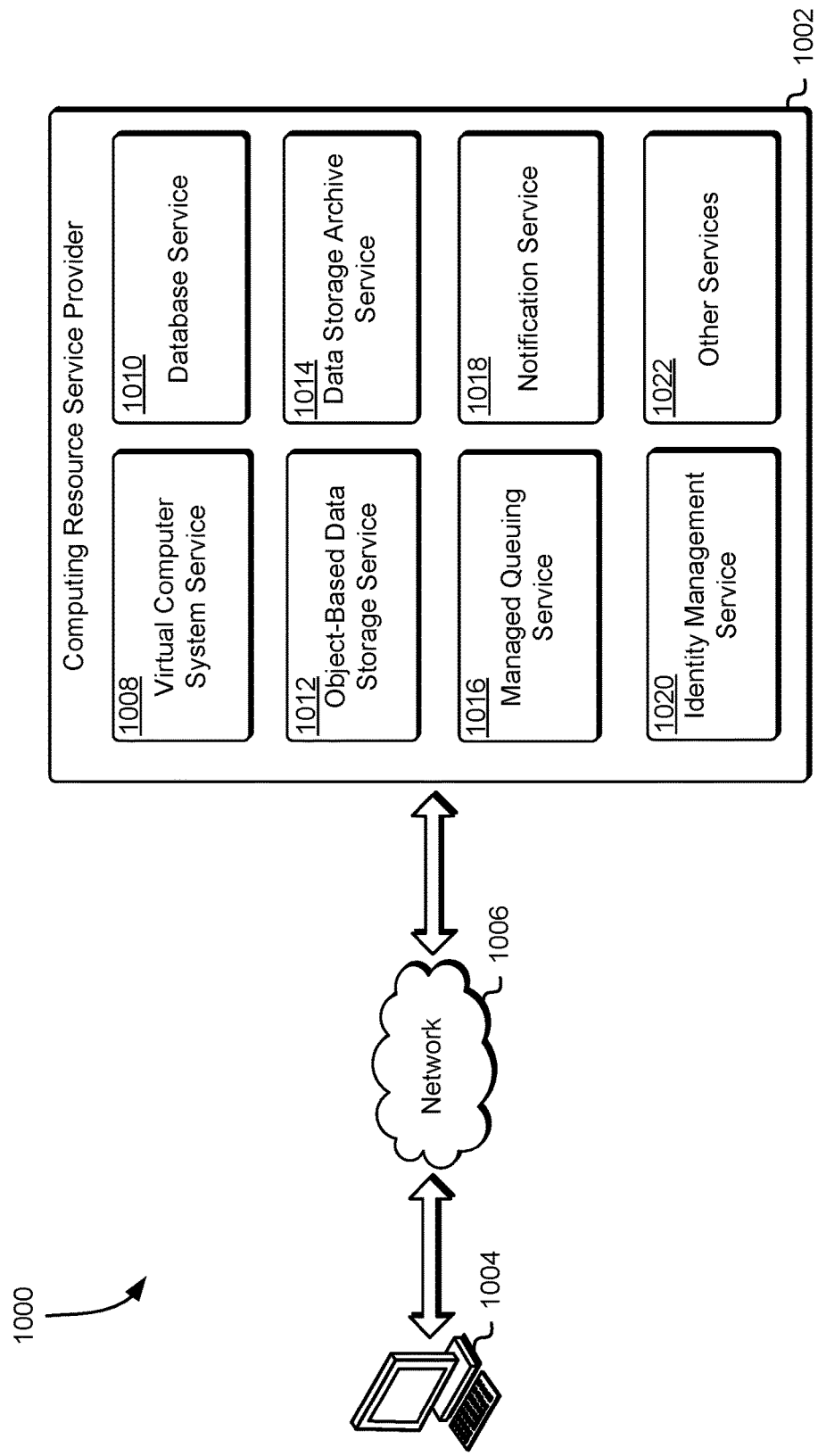
FIG. 10 shows an illustrative example of an environment in which various embodiment can be implemented.

FIG. 10 shows an illustrative example of an environment 1000 in which various embodiments can be implemented. In the environment 1000, a computing resource service provider 1002 may provide a variety of services to a customer 1004 or other users. The customer 1004 may be an organization that may utilize the various services provided by the computing resource service provider 1002 to remotely generate and maintain one or more resources and provide a mapping of user roles for use within a customer network to enable management of one or more delegated access permissions to define a level of access for users of his or her resources. As illustrated in FIG. 10, the customer 1004 may communicate with the computing resource service provider 1002 through one or more communications networks 1006, such as the Internet. Some communications from the customer 1004 to the computing resource service provider 1002 may cause the computing resource service provider 1002 to operate in accordance with various techniques described herein or variations thereof.

As noted above, a computing resource service provider 1002 may provide various computing resource services to its customers. For instance, in this particular illustrative example, the computing resource service provider 1002 provides at least seven types of services. The services provided by the computing resource service provider, in this example, include a virtual computer system service 1008, a database service 1010, an object-based data storage service 1012, a data storage archive service 1014, a managed queuing service 1016, a notification service 1018, an identity management service 1020 and one or more other services 1022, although not all embodiments of the present disclosure will include all such services and additional services may be provided in addition to or as an alternative to services explicitly described herein.

The virtual computer system service 1008 may be a collection of computing resources configured to instantiate virtual machine instances onto virtual computer systems on behalf of the customers 1004 of the computing resource service provider 1002. Customers 1004 of the computing resource service provider 1002 may interact with the virtual computer system service 1008 to provision and operate virtual computer systems that are instantiated on physical computing devices hosted (e.g., physical hosts) and operated by the computing resource service provider 1002. The virtual computer systems may be used for various purposes, such as to operate as servers supporting a website. Other applications for the virtual computer systems may be to support database applications, electronic commerce applications, business applications and/or other applications.

The database service 1010 may be a collection of computing resources that collectively operate to run one or more databases for one or more customers 1004. Customers 1004 of the computing resource service provider 1002 may operate and manage a database from the database service 1010 by utilizing appropriately configured API calls. This, in turn, may allow a customer 1004 to maintain and potentially scale the operations in the database.

The object-based data storage service 1012 may comprise a collection of computing resources that collectively operate to store data for a customer 1004. The data stored in the data storage service 1012 may be organized into data objects. The data objects may have arbitrary sizes except, perhaps, for certain constraints on size. Thus, the object-based data storage service 1012 may store numerous data objects of varying sizes. The object-based data storage service 1012 may operate as a key value store that associates data objects with identifiers of the data objects which may be used by the customer to retrieve or perform other operations in connection with the data objects stored by the object-based data storage service 1012. Access to the object-based data storage service 1012 may be through appropriately configured API calls.

The data storage archive service 1014 may comprise a collection of computing resources that collectively operate to provide storage for data archiving and backup of customer data. The data storage archive service 1014 may thus be configured to persistently store data that may be infrequently accessed and for which long retrieval times are acceptable to a customer 1004 utilizing the service. A customer 1004 may interact with the data storage archive service 1014 to generate one or more archives. Each archive may represent one or more data files that may be combined to form the archive. Accordingly, a customer 1004, through appropriately configured API calls to the service, may upload and retrieve archives from the data storage archive service 1014 and monitor the retrieval of these archives, as each retrieval job may typically require several hours to complete.

The managed queuing service 1016 may be a collection of computing resources configured to enable customers 1004 to store one or more messages in queues for use by one or more services provided by the computing resource service provider 1002. Each message that is stored in a queue may comprise one or more appropriately configured API calls which, when processed by the recipient service, may cause the service to perform one or more actions. Alternatively, each message may comprise any variation of text, such as programming code, URLs for data objects and other statements.

The notification service 1018 may be a collection of computing resources configured to enable customers 1004 to send and receive notifications through a communications network 1106. A customer 1004 may utilize an interface, provided by the computing resource service provider 1002, to create or subscribe to one or more subjects to which one or more messages may be published through. For instance, a customer 1004 may use the interface to create a new subject and subscribe to this subject by specifying that any messages published to the subject may be transmitted to a particular location (e.g., electronic mail address, one or more servers, an existing queue within the managed queuing service 1016, etc.). Accordingly, when a customer 1104 publishes a message to the subject, the message may be transmitted to each recipient subscribed to the subject.

The identity management service 1020 may provide a variety of services to enable customers 1004 to define a level of access to other services, such as those illustrated in FIG. 10, provided by the computing resource service provider 1002 and to define a level of access to resources provided by the customers 1004 and other entities. Accordingly, a customer 1004 may access the identity management service 1020 to access his/her customer account to create and manage one or more mappings of user roles for defining a level of access to resources within a customer network, which may be used by identity management service 1020 to define a level of access to customer resources for users and groups that may utilize the services provided by the computing resource service provider 1002. A customer 1004 may further utilize the identity management service 1020 to generate one or more policies, which may be used to define a level of access to resources and services.

The identity management service 1020 may be configured to receive requests from the computing resource service provider 1002, as well as one or more user roles obtained from a cookie provided by a user of the customer network. The identity management service 1020 may utilize these user roles, as well as the mapping of user roles from the customer 1004 account, to identify one or more delegated access permissions usable to define a level of access to one or more resources within the computing resource service provider 1002 network. Accordingly, the identity management service 1002 may utilize the newly generated delegated access permissions to create a temporary token usable to enable a user to access customer resources.

Figure 11:
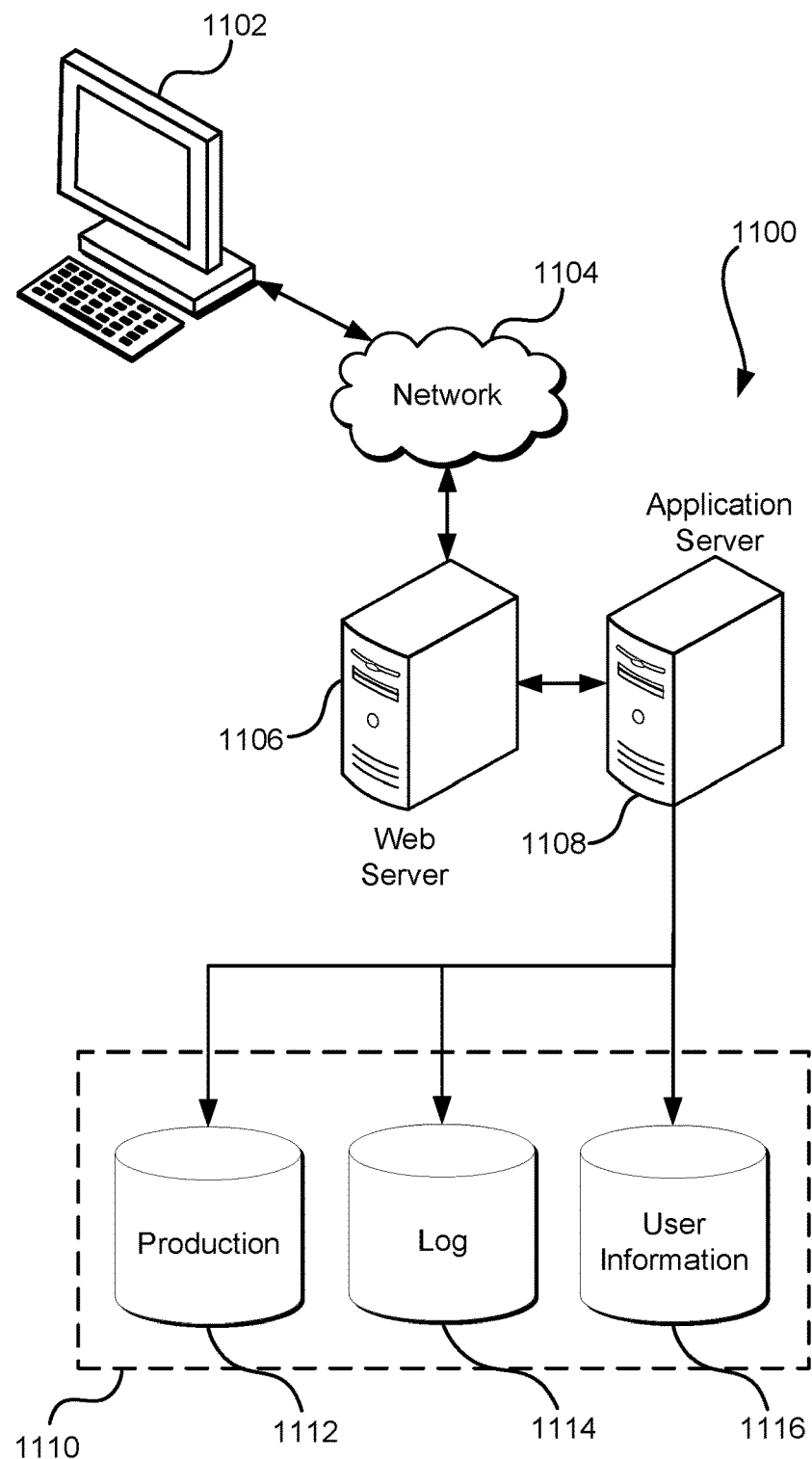
FIG. 11 shows an illustrative example of an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail.

Communication over the network can be enabled by wired or wireless connections and combinations thereof. In this example, the network includes the Internet, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 1102 and the application server 1108, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
receiving, from a client device connected to an on-premises network, a first token specifying an identity corresponding to a first set of permissions for access to a plurality of off-premises resources and specifying a second set of permissions applicable to at least some off-premises resources of the plurality of off-premises resources;
providing, to the client device connected to the on-premises network, a second token specifying the first set of permissions, the first set of permissions determined based at least in part on the second set of permissions;
receiving a request from the client device to access the plurality of off-premises resources, the request including the second token; and
as a result of receipt of the request, accessing information encoding the first set of permissions from a source different from the second token to determine a manner in which to process the request based at least in part on the accessed information.

2. The computer-implemented method of claim 1, wherein the first set of permissions for access to the plurality of off-premises resources are managed within the on-premises network.

3. The computer-implemented method of claim 1, wherein the first set of permissions is changeable between providing the second token to the client device and receipt of the request.

4. The computer-implemented method of claim 1, further comprising exchanging the second token included in the request with a third token, the third token usable to process the request in the manner.

5. A system, comprising:
one or more processors; and
memory including instructions that, as a result of being executed by the one or more processors, cause the system to:
provide, to a client device connected to an on-premises network, a token specifying a first set of permissions for access to one or more off-premises resources, the token provided in response to having received a token from the client device specifying an identity corresponding to the first set of permissions and specifying a second set of permissions applicable to at least some of the one or more off-premises resources, the first set of permissions determined based at least in part on the second set of permissions;
receive a request from the client device to access the one or more off-premises resources, the request including the token; and
in response to the request, access information encoding the first set of permissions from a source different from the token to determine a manner in which to process the request based at least in part on the accessed information.

6. The system of claim 5, wherein the token is provided to the client device by an identity provider operating within the on-premises network, the identity provider configured to utilize a set of credentials from the client device to identify the identity corresponding to the first set of permissions.

7. The system of claim 5, wherein the token specifying the first set of permissions is a cookie usable to access an interface provided by a computing resource service provider on the off-premises network.

8. The system of claim 5, wherein the instructions further cause the system to exchange the token included in the request with a second token, the second token usable to process the request in the manner.

9. The system of claim 8, wherein the second token is a policy document comprising one or more policy statements specifying the first set of permissions, the policy document accessible by one or more services hosted on the off-premises network.

10. The system of claim 8, wherein the second token is a temporary token configured with an expiration enforceable by one or more components of the off-premises network.

11. The system of claim 5, wherein the first set of permissions are changeable between providing the token to the client device and receipt of the request.

12. The system of claim 5, wherein the first set of permissions for access to the one or more off-premises resources are managed within the on-premises network.

13. A non-transitory computer-readable storage medium having stored thereon executable instructions that, as a result of being executed by one or more processors of a computer system, cause the computer system to at least:
receive a first token specifying an identity corresponding to a first set of permissions for access to off-premises resources and specifying a second set of permissions applicable to at least some of the off-premises resources;
provide, to a client device connected to an on-premises network, a second token specifying the first set of permissions, the first set of permissions determined based at least in part on the second set of permissions;
receive a request from the client device to access the off-premises resources, the request including the second token; and
access information encoding the first set of permissions from a source different from the second token to determine a manner in which to process the request based at least in part on the accessed information.

14. The non-transitory computer-readable storage medium of claim 13, the first set of permissions for access to the off-premises resources are managed within the on-premises network.

15. The non-transitory computer-readable storage medium of claim 13, wherein the first set of permissions are changeable between providing the second token to the client device and receipt of the request.

16. The non-transitory computer-readable storage medium of claim 13, wherein the instructions further comprise instructions that, when executed by the one or more processors, cause the computer system to exchange the second token included in the request with a third token, the third token usable to process the request in the manner.

17. The non-transitory computer-readable storage medium of claim 16, wherein the third token is a policy document comprising one or more policy statements specifying the first set of permissions, the policy document accessible by a service hosted on the off-premises network.

18. The non-transitory computer-readable storage medium of claim 16, wherein the third token is a temporary token configured with an expiration enforceable by one or more components of the off-premises network.

19. The non-transitory computer-readable storage medium of claim 13, wherein the second token is an encrypted cookie that, when decrypted, specifies the first set of permissions and is usable to access an interface provided by a computing resource service provider on the off-premises network.

20. The non-transitory computer-readable storage medium of claim 13, wherein the second token is provided to the client device by an identity provider operating within the on-premises network, the identity provider configured to utilize a set of credentials from the client device to identify the identity corresponding to the first set of permissions.

* * * * *